Patented Oct. 6, 1936

2,056,899

UNITED STATES PATENT OFFICE 2,056,899

SUBSTITUTED AMINO-TRIFLUORO-METHYL-BENZENES

Erwin Hoffa and Fritz Müller, Frankfort-on-the-Main, Germany, assignors to General Aniline Works, Inc., New York, N. Y., a corporation of Delaware No Drawing. Application March 28, 1935, Serial No. 13,578. In Germany October 10, 1930

2 Claims. (Cl. 260—130.5)

The present invention relates to substituted amino trifluoromethyl-benzenes selected from the group consisting of 1-amino-2-methoxy-5-trifluoromethyl-benzene, 1-amino-2-chloro-5-trifluoromethyl-benzene and 1-amino-2-nitro-4-trifluoromethyl-benzene.

This application is a continuation-in-part of U. S. Patent No. 1,999,610.

The compounds above referred to, which are valuable intermediates for the preparation of dyestuffs, may be made as follows:

1. 1-amino-2-chloro-5-trifluoromethyl-benzene may be obtained according to the statements of Swarts' "Bulletin de l'academie Royal Belgique" (3), 35, pages 375–420, by causing antimonytrifluoride to react with 2-chloro-5-trichloromethyl-benzene. By fractional distillation of the reaction mixture, the fraction with the lowest boiling point (boiling at 137° C. to 138° C. under a pressure of 750 mm.), namely the 2-chloro-5-trifluoromethylbenzene, is separated in the form of an oil, and by nitrating and reducing this product, the 1-amino-2-chloro-5-trifluoromethyl-benzene (boiling at 82° C. to 83° C. under a pressure of 9–10 mm.) is obtained.

2. 1-amino-2-methoxy-5-trifluoromethyl-benzene may be obtained as follows: Into a solution of 113 grams of 1-nitro-2-chloro-5-trifluoromethyl-benzene in 500 cc. of absolute methyl alcohol there is run during 7 hours a solution of 140 grams of caustic potash in 500 cc. of absolute methyl alcohol at 50° C. to 60° C. The whole is then stirred for 3 hours at 50° C. to 60° C. After the alcohol has been removed, the 1-nitro-2-methoxy-5-trifluoromethyl-benzene is distilled with steam. The product, obtained in the steam-distillate in the form of a crystalline mass, is recrystallized from a mixture of benzene and petroleum ether and then reduced to the amino-compound. 1-amino-2-methoxy-5-trifluoromethyl-benzene melts at 57° C. to 58°C.

3. By treating 1-nitro-2-chloro-5-trifluoromethyl-benzene with ammonia under pressure, it is converted into 1-nitro-2-amino-5-trifluoromethyl-benzene, crystallizing in the form of orange crystals of the melting point 109° C. to 110° C.

We claim:

1. Substituted amino-trifluoromethyl-benzenes selected from the group consiting of 1-amino-2-methoxy-5-trifluoromethyl-benzene, 1-amino-2-chloro-5-trifluoromethyl-benzene and 1-amino-2-nitro-4-trifluoromethyl-benzene.

2. 1-amino-2-chloro-5-trifluoromethyl-benzene corresponding to the following formula:

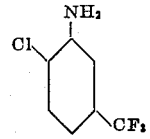

being a colorless oil boiling under a reduced pressure of 9 to 10 mm. at a temperature of 82° C. 83° C.

ERWIN HOFFA.
FRITZ MÜLLER.